(12) United States Patent
Wu

(10) Patent No.: US 12,428,095 B2
(45) Date of Patent: Sep. 30, 2025

(54) FOLDABLE ELECTRIC VEHICLE

(71) Applicant: Jianbin Wu, Dongguan (CN)

(72) Inventor: Jianbin Wu, Dongguan (CN)

( * ) Notice: Subject to any disclaimer, the term of this patent is extended or adjusted under 35 U.S.C. 154(b) by 0 days.

(21) Appl. No.: 18/009,518

(22) PCT Filed: Apr. 14, 2022

(86) PCT No.: PCT/CN2022/086786
§ 371 (c)(1),
(2) Date: Dec. 9, 2022

(87) PCT Pub. No.: WO2023/130604
PCT Pub. Date: Jul. 13, 2023

(65) Prior Publication Data
US 2024/0101215 A1    Mar. 28, 2024

(30) Foreign Application Priority Data
Jan. 6, 2022    (CN) .......................... 202210012877.7

(51) Int. Cl.
*B62K 15/00* (2006.01)
*B62K 11/02* (2006.01)
*B62K 11/14* (2006.01)

(52) U.S. Cl.
CPC ............ *B62K 15/008* (2013.01); *B62K 11/02* (2013.01); *B62K 11/14* (2013.01); *B62K 2015/003* (2013.01); *B62K 2202/00* (2013.01)

(58) Field of Classification Search
CPC ............ B62K 15/008; B62K 2015/003; B62K 15/006; B62K 11/02; B62K 11/14;
(Continued)

(56) References Cited

U.S. PATENT DOCUMENTS

| 6,616,154 B1 * | 9/2003 | Neuhold ............... B62K 3/002 280/87.05 |
| 2016/0009332 A1 | 1/2016 | Sirbu |

(Continued)

FOREIGN PATENT DOCUMENTS

| CN | 202608994 U * | 12/2012 | ........... B62K 15/006 |
| CN | 106005168 A * | 10/2016 | ............... B62K 5/02 |

(Continued)

*Primary Examiner* — Paul N Dickson
*Assistant Examiner* — Matthew D Lee
(74) *Attorney, Agent, or Firm* — MUNCY, GEISSLER, OLDS & LOWE, P.C.

(57) ABSTRACT

A foldable electric vehicle includes a handlebar assembly, a steering pole assembly, a pedal assembly, a driving device and a wheel assembly; the handlebar assembly includes a handlebar head component and a handle component, and a first folding component is provided between the handlebar head component and the handle component; the steering pole assembly includes a handlebar connecting part, a wheel connecting part and an intermediate connecting part, a second folding component is provided between the handlebar connecting part and the intermediate connecting part, and is also provided between the intermediate connecting part and the wheel connecting part; and the pedal assembly includes a front pedal frame and a rear pedal frame, and a third folding component is provided between the front pedal frame and the rear pedal frame.

8 Claims, 8 Drawing Sheets

(58) Field of Classification Search
CPC ............ B62K 2204/00; B62K 2202/00; B62K 21/12; B62K 21/16; B62K 15/00; B62K 3/002
See application file for complete search history.

(56) References Cited

U.S. PATENT DOCUMENTS

2018/0170473 A1* 6/2018 Koo .................. B62J 50/10
2024/0132176 A1* 4/2024 Owen ................ B62K 15/006
2025/0050965 A1* 2/2025 Roh ................ B62K 15/008

FOREIGN PATENT DOCUMENTS

| CN | 206049925 U | | 3/2017 | |
| CN | 108357611 A | | 8/2018 | |
| CN | 109319034 A | * | 2/2019 | ............ B62K 15/00 |
| CN | 110294061 A | * | 10/2019 | .......... B62K 15/008 |
| CN | 209833870 U | | 12/2019 | |
| CN | 212401458 U | | 1/2021 | |
| CN | 114132420 A | | 3/2022 | |
| CN | 217100316 U | | 8/2022 | |
| CN | 114987670 A | * | 9/2022 | ............ B62K 25/04 |
| CN | 217496404 U | * | 9/2022 | |
| CN | 117799737 A | * | 4/2024 | ............ B62K 21/26 |
| CN | 118419190 A | * | 8/2024 | ......... B60B 33/0002 |
| WO | WO2014080412 A2 | | 5/2014 | |
| WO | WO-2023022498 A1 | * | 2/2023 | ............ B62K 21/22 |

\* cited by examiner

FOLDABLE ELECTRIC VEHICLE

CROSS-REFERENCE TO RELATED APPLICATIONS

This application claims priority to PCT Application No. PCT/CN2022/086786, having a filing date of Apr. 14, 2022 based on Chinese application No. 202210012877.7 having a filing date of Jan. 6, 2022, the entire contents of foresaid documents are hereby incorporated by reference.

TECHNICAL FIELD

The present disclosure relates to the field of portable vehicle, and particularly relates to a foldable electric vehicle.

BACKGROUND

As the green travel concept has been advocated, an increasing number of people choose to travel by public transport. As the city grows in size, there are often several kilometers away from the subway station to the home, hence people require a vehicle for short-range travel. A foldable electric vehicle has the characteristics of small size, light weight and portability, and it may be the best choice of a vehicle for short-range travel. Although the current electric vehicle is relatively light and foldable, the efficiency and pattern of folding the electric vehicle are still unsatisfying. Especially for the folding pattern, the whole body of the electric vehicle generally needs to be laid down and then folded, which causes great inconvenience to operate in a crowded environment and is not applicable to the circumstance where people are getting on and off against time in the public transport. To fold the electric vehicle quickly and conveniently in order to adapt to various circumstances, it is necessary to bring improvements to one or more parts and foldable mechanisms accordingly.

SUMMARY

In order to overcome a drawback described above of the prior art, it is an object of the present disclosure to provide a foldable electric vehicle, which aims to solve a problem of the prior art.

In order to achieve an object of the present disclosure, a technical solution adopted is as follows:
the foldable electric vehicle includes:
a handlebar assembly, a steering pole assembly, a pedal assembly, a driving device and a wheel assembly; wherein,
the handlebar assembly is connected to one end of the steering pole assembly, the wheel assembly includes a front wheel component provided on the other end of the steering pole assembly and a rear wheel component connected to the pedal assembly, and the driving device is employed for driving the wheel assembly to rotate;
wherein the handlebar assembly includes a handlebar head component and a handle component, and a first folding component is provided between the handlebar head component and the handle component;
wherein the steering pole assembly includes a handlebar connecting part, a wheel connecting part and an intermediate connecting part, a second folding component is provided between the handlebar connecting part and the intermediate connecting part, and is also provided between the intermediate connecting part and the wheel connecting part; and
wherein the pedal assembly includes a front pedal frame and a rear pedal frame, and a third folding component is provided between the front pedal frame and the rear pedal frame.

Optionally, the first folding component includes a first hinged bar with one end hinged to the handlebar head component, and with the other end connected to the handle component, and the first hinged bar is sleeved with a sliding sleeve 1032 capable of sliding relative to the first hinged bar.

Optionally, the second folding component includes a steering pole folding base provided on the intermediate connecting part, a steering pole folding clasp provided on the handlebar connecting part and the wheel connecting part, and a first locking mechanism, a side of the steering pole folding base is hinged to a side of the steering pole folding clasp, and the first locking mechanism is employed for fixing the other side of the steering pole folding base to the other side of the steering pole folding clasp.

Optionally, a folding between the intermediate connecting part and the wheel connection part is in a direction toward the pedal assembly, and a folding between the handlebar connecting part and the intermediate connecting part is in a direction toward a side surface of the front wheel component.

Optionally, the third folding component includes a front foldable pedal chassis provided on the front pedal frame, a rear foldable pedal chassis provided on the rear pedal frame, and a second locking mechanism; one end of the front foldable pedal chassis is hinged to an end of the rear foldable pedal chassis, and the other end of the front foldable pedal chassis is fixed to the rear foldable pedal chassis by the second locking mechanism.

Optionally, the second locking mechanism comprises a pedal locking base, a first locking plate and a second locking plate; the pedal locking base and the first locking plate are hinged to the second locking plate respectively, the rear foldable pedal chassis is provided with a recess fitting with the first locking plate, the second locking plate is provided with a locking snap-fit component capable of moving relative to the second locking plate, and the pedal locking base is provided with a snapping part that is engaged with the locking snap-fit component such that the first locking plate is fastened into the recess.

Optionally, a first elastic member is provided between the locking snap-fit component and the second locking plate; and the locking snap-fit component is moved relative to the second locking plate so as to be separated from the snapping part and stress the first elastic member to be in a compressed state.

Optionally, a limiting member is provided on the front foldable pedal chassis and is in sliding fit with the front foldable pedal chassis, one end of the limiting member abuts against a hinged joint of the rear foldable pedal chassis and the front foldable pedal chassis, a limiting hole is formed on the rear foldable pedal chassis, and the rear foldable pedal chassis and the front foldable pedal chassis are in an opening state so that the limiting member is accommodated to the limiting hole.

Optionally, the limiting member includes a limiting pin slidably arranged in the front foldable pedal chassis, and a limiting sleeve arranged on the front foldable pedal chassis, the limiting pin and the limiting sleeve are in sliding fit and form a limiting groove having a variable space, and a second elastic member is provided in the limiting groove.

Optionally, the pedal assembly further comprises a front pedal body and a rear pedal body, the front pedal body and the rear pedal body are connected in an articulated manner, the front pedal body is connected to the front pedal frame, and the rear pedal body is positioned correspondingly to the rear pedal frame.

Compared to the prior art, an advantageous effect of the present disclosure are as follows:

The foldable electric vehicle provided by the present disclosure is provided with a plurality of folding assemblies, which may effectively reduce the space occupied by the electric vehicle after being folded. The foldable electric vehicle has a rational design, good portability and can be easily folded.

BRIEF DESCRIPTION OF DRAWINGS

In order to more clearly illustrate the technical solutions of some embodiments of the present disclosure, the following will briefly introduce the drawings that are utilized in the description of some embodiments. It is obvious that the drawings described below will explain some embodiments of the present disclosure. Those skilled in the art may obtain other drawings according to these drawings without any inventive effort.

LIST OF REFERENCE CHARACTERS

Figure 1:
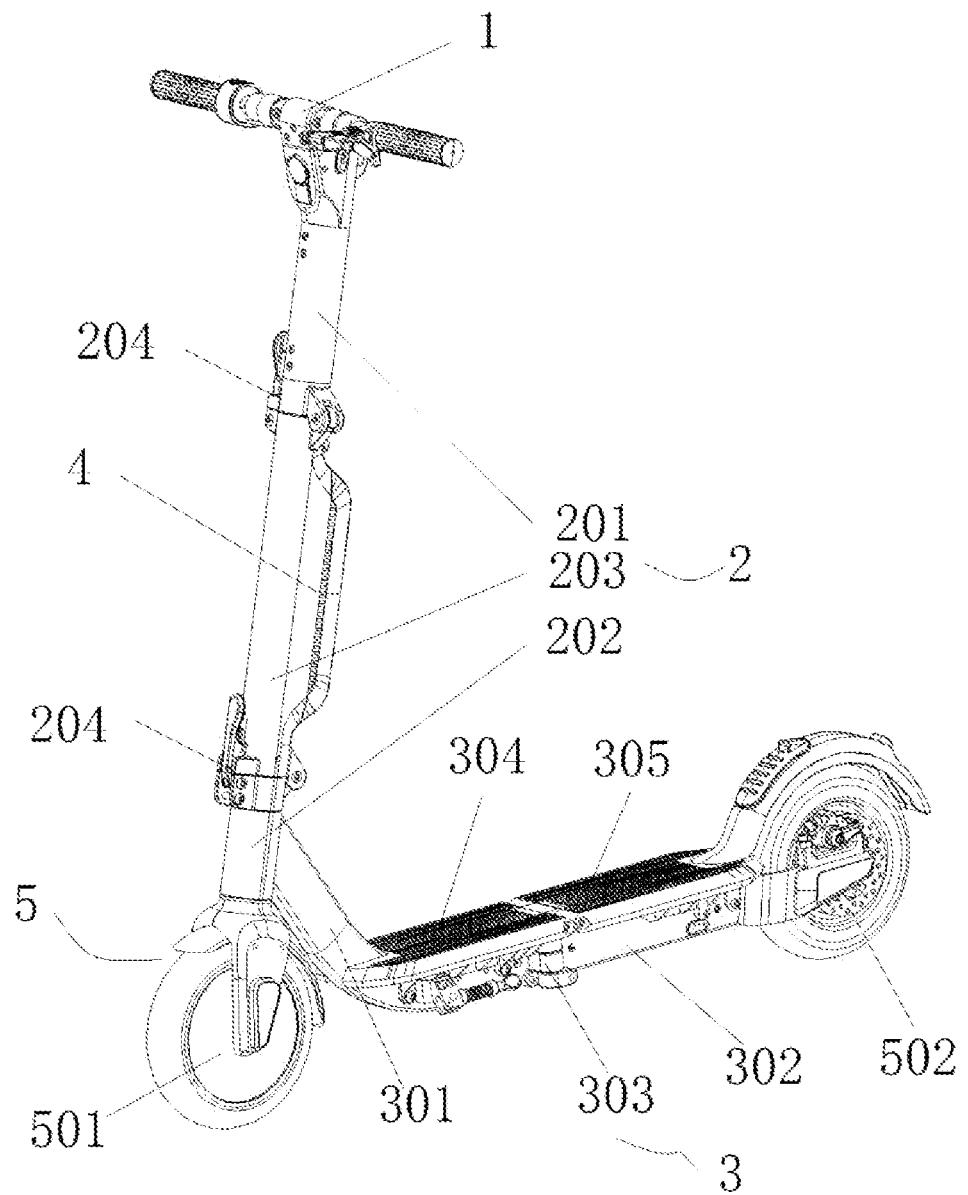
FIG. 1 is a structural schematic diagram illustrating a foldable electric vehicle in an unfolded state of the present disclosure.

1—handlebar assembly
101—handlebar head component
102—handle component
103—first folding component
1031—first hinged bar
1032—sliding sleeve
2—steering pole assembly
201—handlebar connecting part
202—wheel connecting part
203—intermediate connecting part
204—second folding component
2041—steering pole folding base
2042—steering pole folding clasp
2043—pulling component
2044—movable snap component
2045—fixed snap component
3—pedal assembly
301—front pedal frame
302—rear pedal frame
303—third folding component
3031—front foldable pedal chassis
3032—rear pedal foldable chassis
3033—pedal locking base
3034—first locking plate
3035—second locking plate
3036—recess
3037—locking snap-fit component
3038—snapping part
3039—locking snap
304—front pedal body
305—rear pedal body
306—hinged part
307—fixed part
308—fastening hole
309—fastening member
310—limiting hole
311—limiting pin
312—limiting sleeve
313—limiting groove
314—second elastic member
4—driving device
5—wheel assembly
501—front wheel component
502—rear wheel component

DETAILED DESCRIPTION OF EMBODIMENTS

For a clearer understanding of the technical problems to be solved, the technical solutions to be utilized and the technical effects to be achieved by the present disclosure, a further detailed description of embodiments of the present disclosure will be presented below. It will be apparent that the specific embodiments described are only some of the embodiments of the present disclosure and shall not be treated as being exhaustive. Based on the embodiments of the present disclosure, all other embodiments obtained by a person skilled in the art without inventive effort fall within the scope of the present disclosure.

In the present disclosure, unless otherwise expressly specified or defined, the expression of a first feature is "above" or "below" a second feature may include that the first feature and the second feature are in direct contact, and may also include that the first feature and the second feature are not in direct contact but are in contact through additional features between them. Furthermore, the expression of the first feature is "over", "above" or "on" the second feature includes that the first feature is directly above and obliquely above the second feature, or merely indicates that the first feature is higher than the second feature in height. And the expression of the first feature is "under", "below" or "beneath" the second feature includes that the first feature is directly beneath and obliquely beneath the second feature, or merely indicates that the first feature is lower than the second feature in height.

Referring to FIGS. 1 to 7, an embodiment of the present disclosure provides a foldable electric vehicle that includes a handlebar assembly 1, a steering pole assembly 2, a pedal assembly 3, a driving device 4, and a wheel assembly 5.

The wheel assembly 5 includes a front wheel component 501 connected to the steering pole assembly 2 and a rear wheel component 502 connected to the pedal assembly 3.

Figure 2:
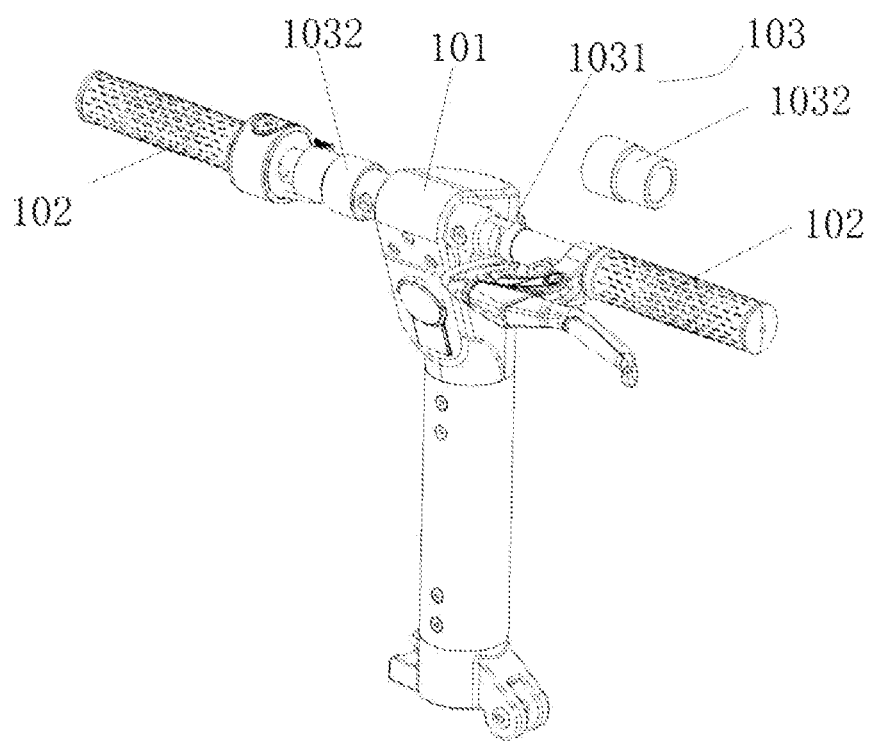
FIG. 2 is a structural schematic diagram of a first folding component according to the present disclosure.

In an embodiment of the present disclosure, specifically, referring to FIG. 2, the handlebar assembly 1 includes a handlebar head component 101 and handle components 102. The handle components 102 are arranged at both sides of the handlebar head component 101. A first folding component 103 is provided between the handlebar head component 101 and each of the handle components 102. The first folding component 103 includes a first hinged bar 1031 hinged to the handlebar head component 101 at one end, the handle component 102 is connected to the other end of the first hinged bar 1031, and the first hinged bar 1031 is sleeved with a sliding sleeve 1032 capable of sliding relative to the first hinged bar 1031.

The handlebar assembly 1 may achieve a folding function, and the specific principle is as follows:

The sliding sleeve 1032 is moved away from a hinged joint of the handlebar head component 101 and the handle component 102, and the handle components 102 at both sides of the handlebar head component 101 are folded close to each other by the hinged structure of the first hinged bar 1031.

Figure 3:
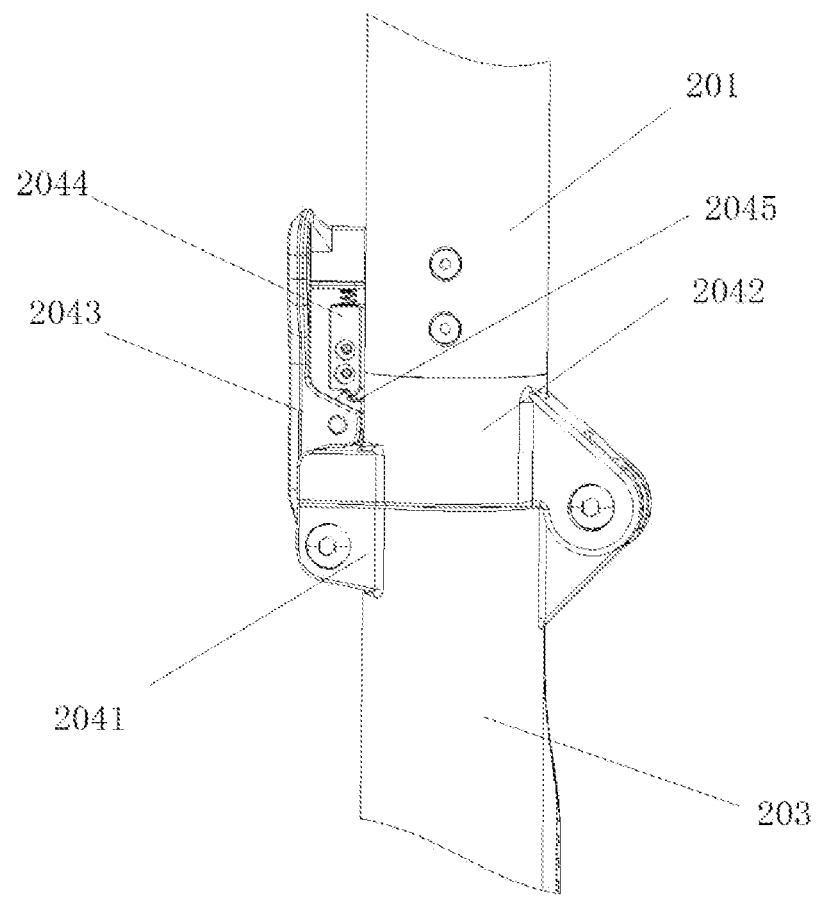
FIG. 3 is a structural schematic diagram of a second folding component according to the present disclosure.

With reference to FIGS. 1 and 3, the steering pole assembly 2 includes a handlebar connecting part 201, a wheel connecting part 202 and an intermediate connecting part 203, a second folding component 204 is provided between the handlebar connecting part 201 and the intermediate connecting part 203 and is also provided between the intermediate connecting part 203 and the wheel connecting part 202. The second folding component 204 includes a steering pole folding base 2041 provided on the intermediate connecting part 203, a steering pole folding clasp 2042 provided on the handlebar connecting part 201 and the wheel connecting part 202, and a first locking mechanism, wherein a side of the intermediate connecting part 203 is hinged to a side of the steering pole folding clasp 2042, and the first locking mechanism is employed for fixing the other side of the intermediate connecting part 203 to the other side of the steering pole folding clasp 2042. Specifically, the first locking mechanism includes a pulling component 2043 provided with a movable snap component 2044 in sliding fit with the pulling component 2043, a spring member is provided between the movable snap component 2044 and the pulling component 2043, and a fixed snap component 2045 is provided at an engaged position of the handlebar connecting part 201 and the intermediate connecting part 203 as well as an engaged position of the wheel connecting part 202 and the intermediate connecting part 203.

In an embodiment of the present disclosure, specifically, a folding between the intermediate connecting part 203 and the wheel connecting part 202 is in a direction toward the pedal assembly 3, and a folding between the handlebar connecting part 201 and the intermediate connecting part 203 is in a direction toward a side surface of the front wheel component 501.

The steering pole assembly 2 may achieve a folding function, and the specific principle is as follows:

Both the handlebar connecting part 201 and the wheel connecting part 202 may be folded with respect to the intermediate connecting part 203, respectively, to achieve a double folding of the steering pole assembly 2. The movable snap component 2044 is adjusted to be separated from the fixed snap component 2045 and then the pulling component 2043 is shifted to move the movable snap component 2044 away from the fixed snap component 2045, so that the first locking mechanism is unlocked, and the engaged position of the handlebar connecting part 201 and the intermediate connecting part 203, as well as the engaged position of the wheel connection part 202 and the intermediate connecting part 203 may be opened to achieve the folding effect. The folding direction between the intermediate connecting part 203 and the wheel connection part 202 is different from the folding direction between the handlebar connecting part 201 and the intermediate connecting part 203, so that the steering pole assembly 2 may be better folded without interfering with the pedal assembly 3, and may be better accommodated.

Figure 4:
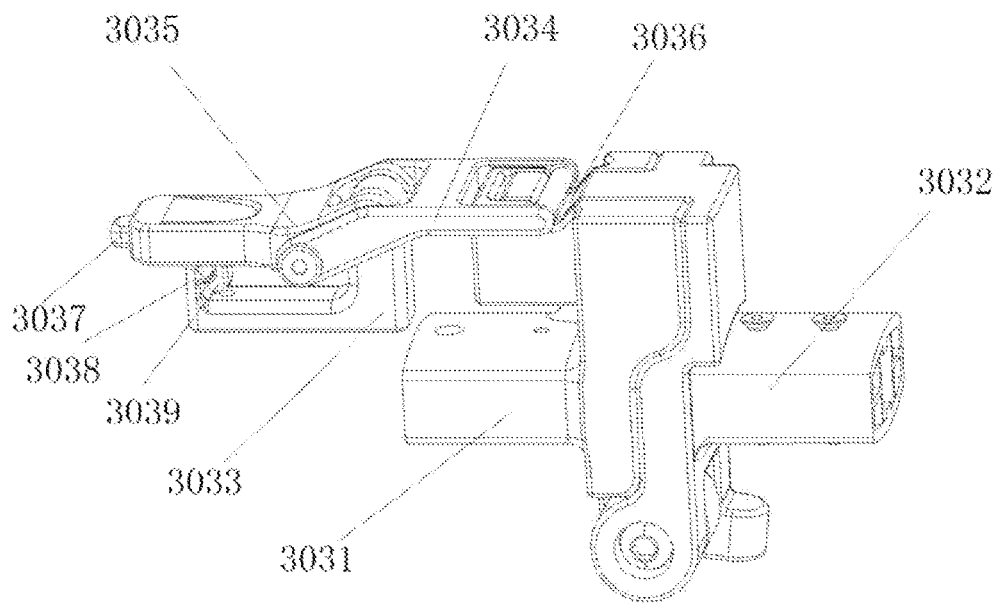
FIG. 4 is a structural schematic diagram of a third folding component according to the present disclosure.
Figure 5:
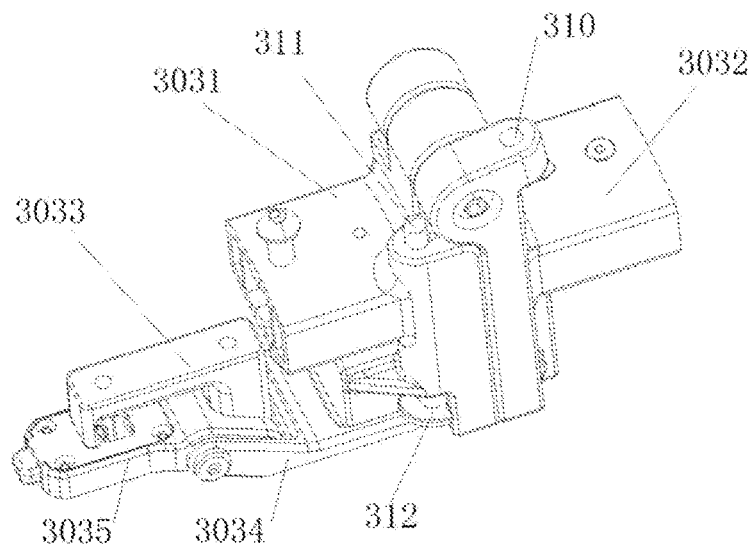
FIG. 5 is a structural schematic diagram of a third folding component from another perspective view according to the present disclosure.

In an embodiment of the present disclosure, with reference to FIGS. 4 and 5, the pedal assembly 3 includes a front pedal frame 301 and a rear pedal frame 302, and a third folding component 303 is provided between the front pedal frame 301 and the rear pedal frame 302. The third folding component 303 includes a front foldable pedal chassis 3031 provided on the front pedal frame 301, a rear foldable pedal chassis 3032 provided on the rear pedal frame 302 and a second locking mechanism, wherein an end of the front foldable pedal chassis 3031 is hinged to an end of the rear foldable pedal chassis 3032, and the other end of the front foldable pedal chassis 3031 and the rear foldable pedal chassis 3032 are fixed by the second locking mechanism. The second locking mechanism includes a pedal locking base 3033, a first locking plate 3034 and a second locking plate 3035; the pedal locking base 3033 and the first locking plate 3034 are hinged to the second locking plate 3035 respectively. The rear foldable pedal chassis 3032 is provided with a recess 3036 fitting with the first locking plate 3034 The second locking plate 3035 is provided with a locking snap-fit component 3037 capable of moving relative to the second locking plate 3035, and the pedal locking base 3033 is provided with a snapping part 3038 that is engaged with the locking snap-fit component 3037 such that the first locking plate 3034 may be fastened into the recess 3036. A first elastic member is provided between the locking snap-fit component 3037 and the second locking plate 3035, and the locking snap-fit component 3037 may be moved relative to the second locking plate 3035 so as to be separated from the snapping part 3038 and stress the first elastic member to be in a compressed state. Specifically, the second locking plate 3035 is provided with a sliding slot where the locking snap-fit component 3037 is arranged, the locking snap-fit component 3037 is in sliding fit with the sliding slot, and the first elastic member is provided between the sliding slot and the locking snap-fit component 3037, the locking snap-fit component 3037 includes a sliding part being in sliding fit with the sliding slot and a locking snap 3039 being in connection with the sliding part and in snap-fit with the snapping part 3038.

Figure 7:
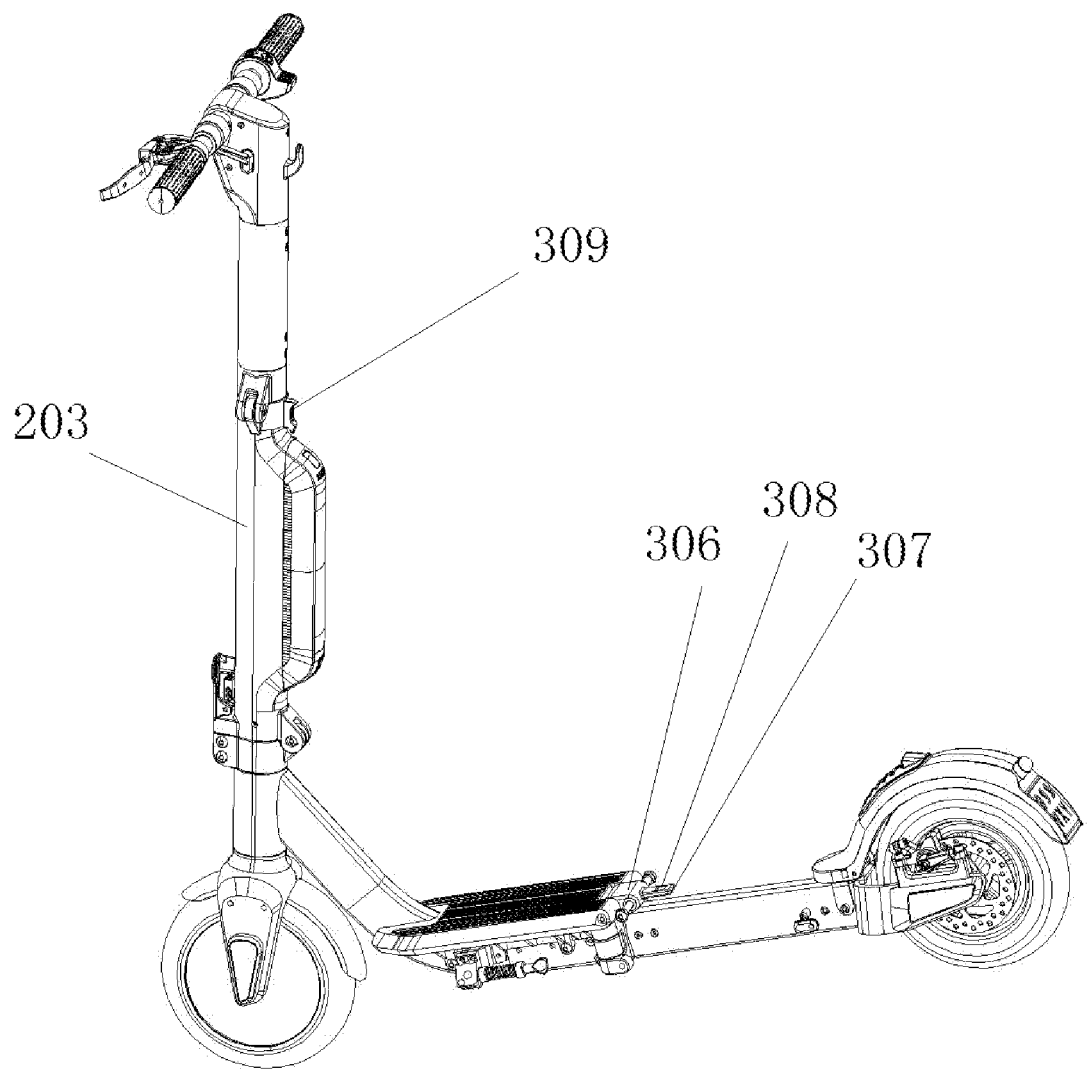
FIG. 7 is a structural schematic diagram of a hinged part according to the present disclosure.

With reference to FIG. 7, the pedal assembly 3 further includes a front pedal body 304 and a rear pedal body 305, wherein the front pedal body 304 and the rear pedal body 305 are connected in an articulated manner, the front pedal body 304 is connected to the front pedal frame 301, and the rear pedal body 305 is positioned correspondingly to the rear pedal frame 302. Specifically, a hinged part 306 is provided between the front pedal body 304 and the rear pedal body 305 to hinge the both, and a fixed part 307 is provided on the hinged part 306, wherein a fastening hole 308 is formed on the fixed part 307, a fastening member 309 is provided on the intermediate connecting part 203, and a hook-shaped element capable of fitting with the fastening hole 308 is provided on the fastening member 309.

The pedal assembly 3 may also achieve a folding function, and the specific principle is as follows:

Firstly, the front pedal frame 301 and the rear pedal frame 302 are folded in such a manner:

The locking snap 3039 and the snapping part 3038 are separated from each other by forcing the sliding part of the locking snap-fit component 3037 to slide in the sliding slot of the second locking plate 3035, and then the first locking plate 3034 is rotated relative to the second locking plate 3035 so that the first locking plate 3034 is separated from the recess 3036 on the rear foldable pedal chassis 3032, and the engaged position of the front foldable pedal chassis 3031 and the rear foldable pedal chassis 3032 are hereby opened so that the front pedal frame 301 and the rear pedal frame 302 are folded close to each other and the folding is done. Since the first locking plate 3034 and the second locking plate 3035 are hinged to each other, the second locking plate 3035 is rotated relative to the pedal locking base 3033 while the first locking plate 3034 is rotated, so that the locking snap-fit component 3037 of the second locking plate 3035 is moved away from the pedal locking base 3033, thereby improving the convenience of operation.

Further, the front pedal body 304 and the rear pedal body 305 are folded in such a manner:

The front pedal body 304 and the rear pedal body 305 are folded close to each other by the hinged part 306 provided between the front pedal body 304 and the rear pedal body 305. Referring to FIG. 7, in order to ensure the stability of the folded state of the foldable electric vehicle, after the front pedal body 304 and the rear pedal body 305 are folded together and the steering pole assembly 2 is folded, the fastening member 309 on the intermediate connecting part 203 is close to the fixed part 307 on the hinged part 306 and the fastening member 309 is engaged with the fastening hole 308, so that the intermediate connecting part 203 and the front pedal body 304 are fixed to each other, thereby achieving the stability of the folded state of the whole foldable electric vehicle.

Figure 6:
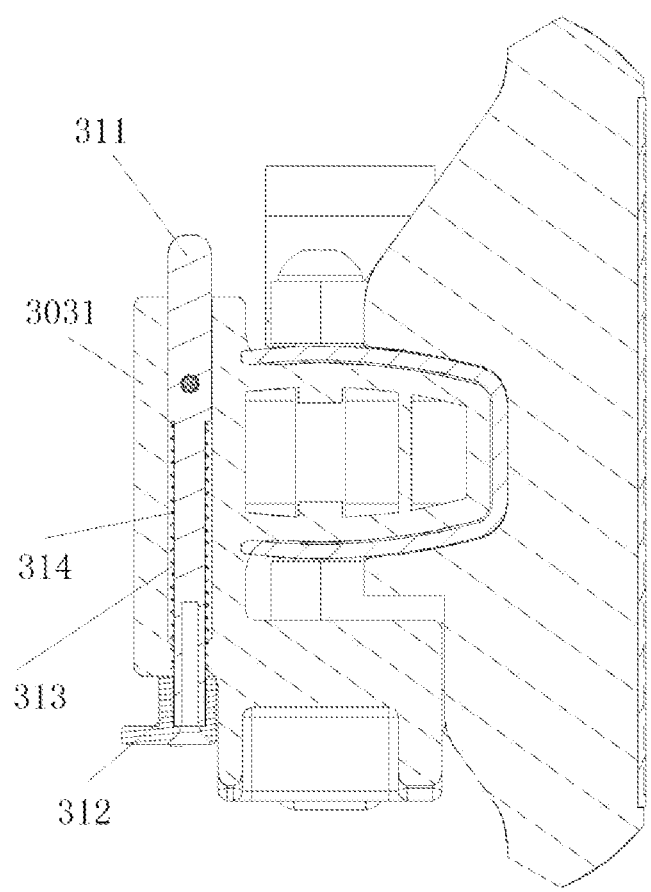
FIG. 6 is a sectional view of a limiting member according to the present disclosure.

Referring to FIGS. 5 and 6, a limiting member may be employed to solve the problem as to how the front pedal frame 301 and the rear pedal frame 302 remain fixed to each other after being folded. Specifically, the limiting member is provided on the front foldable pedal chassis 3031 and is in sliding fit with the front foldable pedal chassis 3031, and one end of the limiting member abuts against a hinged joint of the rear foldable pedal chassis 3032 and the front foldable pedal chassis 3031. A limiting hole 310 is formed on the rear foldable pedal chassis 3032, and the rear foldable pedal chassis 3032 and the front foldable pedal chassis 3031 are in an opening state so that the limiting member is inserted into the limiting hole 310. Specifically, the limiting member includes a limiting pin 311 slidably arranged in the front foldable pedal chassis 3031 and a limiting sleeve 312 arranged on the limiting pin 311, wherein the limiting pin 311 and the limiting sleeve 312 are in sliding fit and form a limiting groove 313 having a variable space, and a second elastic member 314 is provided in the limiting groove 313.

While the second elastic member 314 is in an original state, one end of the limiting pin 311 protrudes outward from the front foldable pedal chassis 3031 and abuts against the hinged joint of the rear foldable pedal chassis 3032 and the front foldable pedal chassis 3031. When a folding is done between the front pedal frame 301 and the rear pedal frame 302, the rear foldable pedal chassis 3032 acts on the limiting pin 311 so that the limiting member is forced to slide in the front foldable pedal chassis 3031, and the second elastic member 314 is hereby in a compressed state. After the folding is done between the rear foldable pedal chassis 3032 and the front foldable pedal chassis 3031, the limiting hole 310 on the rear foldable pedal chassis 3032 is positioned correspondingly to the limiting pin 311. The limiting pin 311 is restored to its original position and inserted into the limiting hole 310 due to the elastic force of the second elastic member 314, therefore the front pedal frame 301 and the rear pedal frame 302 may be in secured positions relative to each other after being folded.

In an embodiment of the present disclosure, the driving device 4 includes a power supply and a driving motor powered by the power supply to drive the wheel assembly 5 to rotate. The power supply may be provided at the intermediate connecting part 203.

It should be noted that the first elastic member and the second elastic member 314 may each be a spring.

In an embodiment of the present disclosure, there may be three specific folded states of the foldable electric vehicle.

Figure 8:
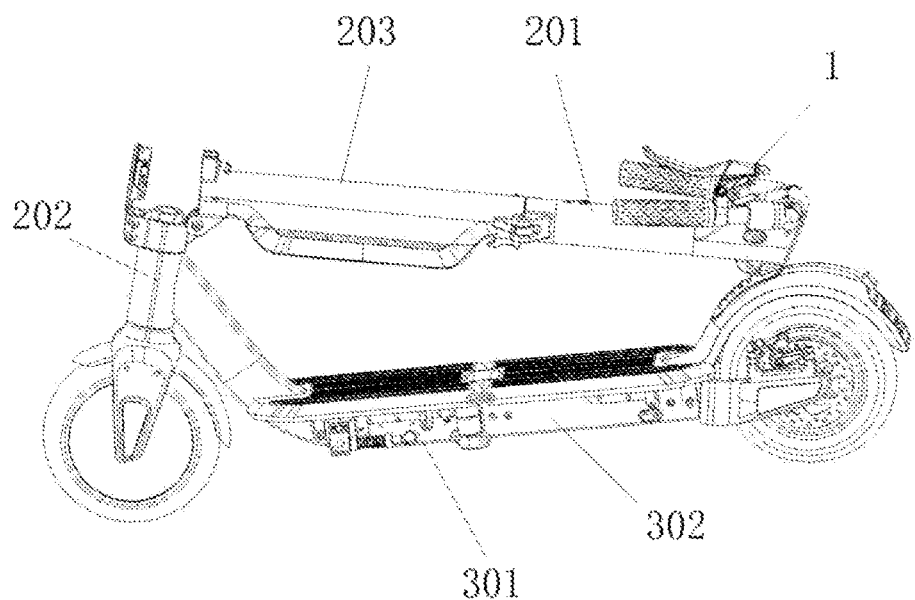
FIG. 8 is a structural schematic diagram illustrating the foldable electric vehicle in a first folded state of the present disclosure.
Figure 9:
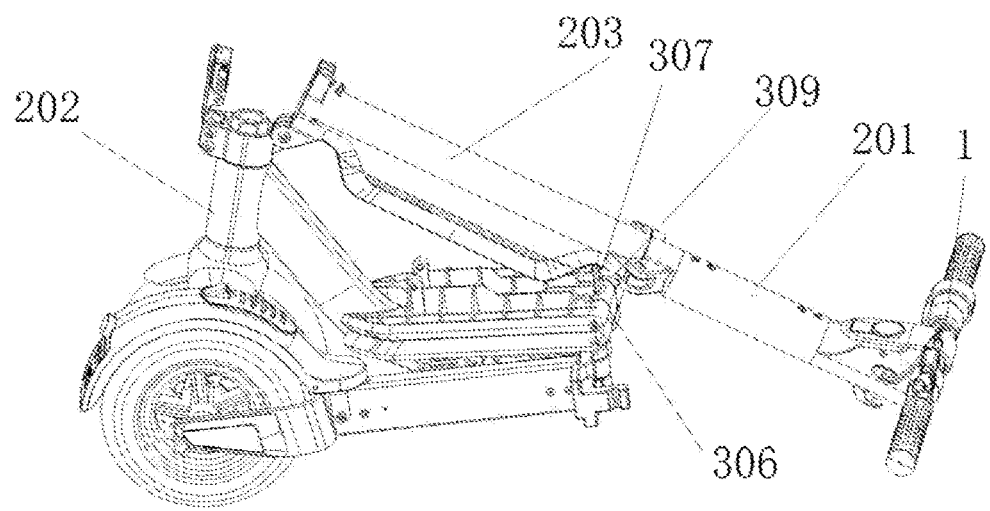
FIG. 9 is a structural schematic diagram illustrating the foldable electric vehicle in a second folded state of the present disclosure.

FIG. 8 shows a first folded state: the intermediate connecting part 203 and the wheel connecting part 202 are in a folded state, the handlebar assembly 1 is in a folded state, and the handlebar assembly 1 rests on the rear wheel member 502;

FIG. 9 shows a second folded state: the intermediate connecting part 203 and the wheel connecting part 202 are in a folded state, and the front pedal frame 301 and the rear pedal frame 302 are in a folded state, so that the user may hold the handlebar assembly 1 to pull the folded electric vehicle as the front wheel component 501 and the rear wheel component serve as rolling members, thereby moving the folded electric vehicle conveniently.

Figure 10:
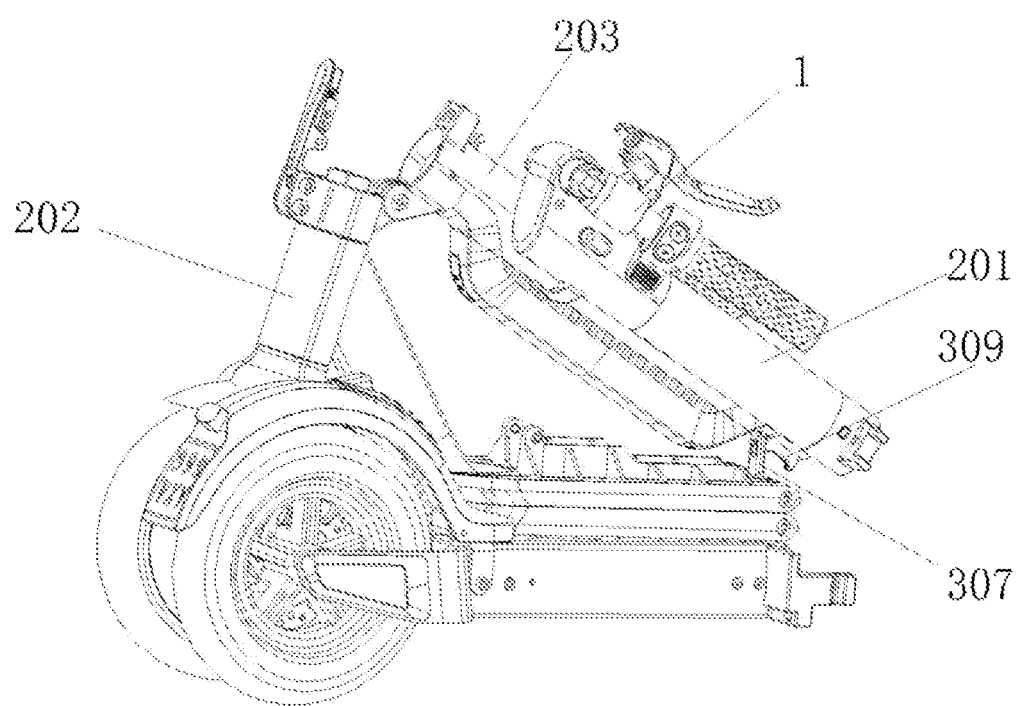
FIG. 10 is a structural schematic diagram illustrating the foldable electric vehicle in a third folded state of the present disclosure.

FIG. 10 shows a third folded state: the intermediate connecting part 203 and the wheel connecting part 202 are in a folded state, the front pedal frame 301 and the rear pedal frame 302 are in a folded state, the handlebar assembly 1 is in a folded state, and the handlebar connecting part 201 and the intermediate connecting part 203 are in a folded state. The folded electric vehicle in the folded state hereby occupies a minimum area and forms a triangular structure, achieving a firmly folded structure which is convenient for storage and occupies relatively small space.

In the description herein, it is appreciated that the terms "upper", "lower", "left", "right", etc. orientation or positional relationship are merely utilized to facilitate the description and to simplify the operation, and do not indicate or imply that the device or element being referred to be obligated to have a particular orientation, be constructed and operated in a particular orientation, and therefore not for purposes of any restrictions or limitations on the disclosure. Furthermore, the terms "first", "second", and the like are used merely to distinguish one from another in the description and are not intended to be limiting.

In the description of this specification, the terms "an embodiment", "an example", etc. means that a particular feature, structure, material, or characteristic described in connection with the embodiment or example is included in at least one embodiment or example of the disclosure. In the description, schematic expressions of the above terms do not necessarily refer to the same embodiment or example.

In addition, it should be understood that while the description has been described in terms of embodiments, not every embodiment includes a single technical solution, the description is described for clarity only, and that a person skilled in the art will take the description as a whole, and the solutions in various embodiments may be appropriately combined to form other embodiments as may be appreciated by a person skilled in the art.

The technical principles of the present disclosure have been described above in connection with specific embodiments. These descriptions are merely for purpose of illustrating the principles of the present disclosure and are not for purposes of any restrictions or limitations on the scope of the disclosure. Based on the explanations herein, a person skilled in the art would have been able to conceive other specific embodiments of the present disclosure without any inventive effort, which would all fall within the scope of the present disclosure.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'include', 'including', 'comprise' or 'comprising' do not exclude other steps or elements.

What is claimed is:

1. A foldable electric vehicle, comprising:
a handlebar assembly, a steering pole assembly, a pedal assembly, a driving device and a wheel assembly;
wherein the handlebar assembly is connected to one end of the steering pole assembly, the wheel assembly comprises a front wheel component provided on the other end of the steering pole assembly and a rear wheel component connected to the pedal assembly, and the driving device is employed for driving the wheel assembly to rotate;
wherein the handlebar assembly comprises a handlebar head component and a handle component, and a first folding component is provided between the handlebar head component and the handle component;
wherein the steering pole assembly comprises a handlebar connecting part, a wheel connecting part and an intermediate connecting part, a second folding component is provided between the handlebar connecting part and the intermediate connecting part, and is also provided between the intermediate connecting part and the wheel connecting part;
wherein the pedal assembly comprises a front pedal frame and a rear pedal frame, and a third folding component is provided between the front pedal frame and the rear pedal frame;
wherein the third folding component comprises a front foldable pedal chassis provided on the front pedal frame, a rear foldable pedal chassis provided on the rear pedal frame and a second locking mechanism; one end of the front foldable pedal chassis is hinged to an end of the rear foldable pedal chassis, and the other end of the front foldable pedal chassis is fixed to the rear foldable pedal chassis by the second locking mechanism; and
wherein the second locking mechanism comprises a pedal locking base, a first locking plate and a second locking plate; the pedal locking base and the first locking plate are hinged to the second locking plate respectively, the rear foldable pedal chassis is provided with a recess fitting with the first locking plate, the second locking plate is provided with a locking snap-fit component capable of moving relative to the second locking plate, and the pedal locking base is provided with a snapping part that is engaged with the locking snap-fit component such that the first locking plate is fastened into the recess.

2. The foldable electric vehicle of claim 1, wherein the first folding component comprises a first hinged bar with one end hinged to the handlebar head component, and with the other end connected to the handle component, and the first hinged bar is sleeved with a sliding sleeve 1032 capable of sliding relative to the first hinged bar.

3. The foldable electric vehicle of claim 1, wherein the second folding component comprises a steering pole folding base provided on the intermediate connecting part, a steering pole folding clasp provided on the handlebar connecting part and the wheel connecting part, and a first locking mechanism, a side of the steering pole folding base is hinged to a side of the steering pole folding clasp, and the first locking mechanism is employed for fixing the other side of the steering pole folding base to the other side of the steering pole folding clasp.

4. The foldable electric vehicle of claim 3, wherein a folding between the intermediate connecting part and the wheel connecting part is in a direction toward the pedal assembly, and a folding between the handlebar connecting part and the intermediate connecting part is in a direction toward a side surface of the front wheel component.

5. The foldable electric vehicle of claim 1, wherein a first elastic member is provided between the locking snap-fit component and the second locking plate; and the locking snap-fit component is moved relative to the second locking plate so as to be separated from the snapping part and stress the first elastic member to be in a compressed state.

6. The foldable electric vehicle of claim 1, wherein a limiting member is provided on the front foldable pedal chassis and is in sliding fit with the front foldable pedal chassis, one end of the limiting member abuts against a hinged joint of the rear foldable pedal chassis and the front foldable pedal chassis, a limiting hole is formed on the rear foldable pedal chassis, and the rear foldable pedal chassis and the front foldable pedal chassis are in an opening state so that the limiting member is accommodated to the limiting hole.

7. The foldable electric vehicle of claim 6, wherein the limiting member comprises a limiting pin slidably arranged in the front foldable pedal chassis, and a limiting sleeve arranged on the front foldable pedal chassis; the limiting pin and the limiting sleeve are in sliding fit and form a limiting groove having a variable space, and a second elastic member is provided in the limiting groove.

8. The foldable electric vehicle of claim 1, wherein the pedal assembly further comprises a front pedal body and a rear pedal body; the front pedal body and the rear pedal body are connected in an articulated manner, the front pedal body is connected to the front pedal frame, and the rear pedal body is positioned correspondingly to the rear pedal frame.

* * * * *